(12) United States Patent
Zhong

(10) Patent No.: US 10,998,930 B1
(45) Date of Patent: May 4, 2021

(54) ZJD BASEBAND CHIP AND ZJD BASEBAND CHIP MANAGEMENT SYSTEM

(71) Applicant: Jiedong Zhong, Guangdong (CN)

(72) Inventor: Jiedong Zhong, Guangdong (CN)

(*) Notice: Subject to any disclaimer, the term of this patent is extended or adjusted under 35 U.S.C. 154(b) by 0 days.

(21) Appl. No.: 16/896,182

(22) Filed: Jun. 8, 2020

(30) Foreign Application Priority Data

Mar. 20, 2020 (CN) .......................... 202010199346.4

(51) Int. Cl.
| | |
|---|---|
| *H04L 5/14* | (2006.01) |
| *H04B 1/403* | (2015.01) |
| *H04B 1/707* | (2011.01) |
| *H04W 88/06* | (2009.01) |
| *H04L 1/00* | (2006.01) |
| *H04B 1/00* | (2006.01) |

(52) U.S. Cl.
CPC ........... *H04B 1/406* (2013.01); *H04B 1/0003* (2013.01); *H04B 1/707* (2013.01); *H04L 1/0003* (2013.01); *H04W 88/06* (2013.01)

(58) Field of Classification Search
CPC ..... H04B 1/0003; H04B 1/707; H04L 1/0003; H04W 88/06
USPC .................................................. 375/222, 219
See application file for complete search history.

(56) References Cited

U.S. PATENT DOCUMENTS

| | | | | |
|---|---|---|---|---|
| 5,652,903 A | * | 7/1997 | Weng .................... | G06F 9/3879 712/35 |
| 2007/0191007 A1 | * | 8/2007 | Hayek .................. | H04W 88/06 455/435.2 |
| 2011/0105155 A1 | * | 5/2011 | Bienas .................. | H04W 48/16 455/458 |
| 2012/0224617 A1 | * | 9/2012 | Feher .................... | H04M 3/382 375/222 |
| 2014/0038672 A1 | * | 2/2014 | Yang .................... | H04W 88/06 455/558 |

* cited by examiner

*Primary Examiner* — Tesfaldet Bocure

(57) ABSTRACT

The present disclosure provides a baseband chip and a baseband chip management system. The baseband chip comprises an application processor, an interface module, a channel encoder, a digital signal processor, and a modem module group. The modem module group includes an integrated modem module and a power module. The integrated modem module comprises at least two modems. The application processor is connected to the interface module, the channel encoder, the digital signal processor, and the power module respectively. The baseband chip management system comprises a baseband chip and a radio frequency integrated system. The radio frequency integrated system comprises at least two radio frequency module systems.

10 Claims, 3 Drawing Sheets

ZJD BASEBAND CHIP AND ZJD BASEBAND CHIP MANAGEMENT SYSTEM

CROSS REFERENCE TO RELATED APPLICATIONS

The present application claims the benefit of Chinese Patent Application No. 202010199346.4 filed on Mar. 20, 2020, the contents of which are incorporated herein by reference in their entirety.

FIELD OF THE DISCLOSURE

The present disclosure relates generally to baseband chip and management system, more specifically, the present disclosure relates to baseband chip and baseband chip management system.

BACKGROUND OF THE DISCLOSURE

The baseband chip refers to a chip used to integrate the baseband signal to be transmitted or to decode the received baseband signal. The currently used baseband chip is divided into 5 sub-blocks: a Multimedia Application Processor (MAP for short), a channel encoder, a digital signal processor, a modem, and an interface module. The modem of the current baseband chip either processes a group of data signals from the radio frequency module system or a group of data signals from an application processor. Coping with the increasing requirement on technical equipment from the modern world, a radio frequency module system gets to be more innovative and to be developed as a radio frequency integrated system. The radio frequency integrated system which is composed of more than two sets of radio frequency module systems, is an integrated system with a plurality of radio frequency modules system, cater to the needs of users performing multiple modes or multiple tasks on one device concurrently. Current baseband chip management system and its technology method limit the applicable scenarios, and are unable to fulfill the needs of processing the modulation and demodulation tasks of multiple data signals on one device in parallel simultaneously.

SUMMARY

In One embodiment, the present disclosure provides a device. The device includes a baseband chip. The baseband chip comprises an application processor, an interface module, a channel encoder, a digital signal processor, and a modem module group. The modem module group includes an integrated modem module and a power module. The integrated modem module comprises at least two modems. The application processor is connected to the interface module, the channel encoder, the digital signal processor, and the power module respectively. The channel encoder is configured to perform channel coding and encryption on service information and control information. The digital signal processor is configured to perform channel equalization using a Viterbi algorithm and speech encoding/decoding based on a Regular Pulse Excited-Long Term Prediction technique. The power module is configured to provide power supply, management, and control for each of the modems. Each of the modems is connected to the application processor and a corresponding radio frequency integrated system, and a plurality of the modems concurrently perform operation tasks of modulation or demodulation on a plurality of pieces of information.

In another embodiment, the baseband chip has an internal power management module. and the power module is connected to the internal power management module so that power is supplied by the internal power management module.

In yet another embodiment, the modem module group manages and controls the integrated modem module and the power module.

In still another embodiment, the application processor manages and controls the operation tasks of the modem module group, and manages and controls the power module to supply power to each group of the modems.

In yet another embodiment, the modem module group sets, for each of the modems, a separate dedicated transmission channel which is connected to the application processor and the radio frequency integrated system, respectively, and the plurality of the modems can concurrently perform modulation and/or demodulation operations.

In a variation on this embodiment, the interface module comprises an analog interface, a digital interface, and a human-machine interface. The analog interface, the digital interface and the human-machine interface are all connected to the application processor so that the application processor is enabled to control and manage the interface module.

In a variation on this embodiment, the baseband chip is applied to a fixed communication terminal, a mobile communication terminal, a fixed device terminal, a mobile device terminal, a mobile vehicle-mounted communication terminal, an aircraft, or an aerospace device communication terminal.

In one embodiment, the present disclosure provides a device management system. The device management system includes a baseband chip management system, the baseband chip management system comprises a baseband chip and a radio frequency integrated system. The radio frequency integrated system comprises at least two radio frequency module systems. The baseband chip is the baseband chip according to any one of the embodiments above, and each of the modems in the baseband chip is connected to a corresponding one of the radio frequency module systems.

In a variation on this embodiment, when information of the radio frequency integrated system is transmitted to the first modem in the integrated modem module, the first modem performs a demodulation operation on the received information, then the demodulated information is transmitted to the application processor for processing; when information of the radio frequency integrated system is transmitted to the second modem in the integrated modem module, the second modem performs a demodulation operation on the received information, then the demodulated information is transmitted to the application processor for processing; and so on, such that demodulation operations are performed on pieces of information from the radio frequency integrated system. And when information of the application processor is transmitted to the first modem in the integrated modem module, the first modem performs a modulation operation on the information, then the modulated information is transmitted to the radio frequency integrated system for a next operation; when information of the application processor is transmitted to the second modem in the integrated modem module, the second modem performs a modulation operation on the received information, then the modulated information is transmitted to the radio frequency integrated system for a next operation; and so on, such that modulation operations are performed on pieces of information from the application processor.

In a variation on this embodiment, the baseband chip management system is applied to a fixed communication terminal, a mobile communication terminal, a fixed device terminal, a mobile device terminal, a mobile vehicle-mounted communication terminal, an aircraft, or an aerospace device communication terminal.

BRIEF DESCRIPTION OF THE FIGURES

In order to explain the embodiment of the disclosure or the technical solution in the prior art more clearly, the following will make a brief introduction to the appended drawings needed in the embodiment or the prior art description. Obviously, the appended drawings in the following description are only some embodiments of the disclosure. Extra drawings which can be obtained without any additional workforce for those skilled people in the prior art are incorporated in this disclosure.

DETAILED DESCRIPTION OF THE DISCLOSURE

The specific embodiments of the disclosure will be further described in combination with the appended drawings and embodiments. The following embodiments are only used to explain the technical solution of the disclosure more clearly, and cannot limit the protection scope of the disclosure.

Figure 1:
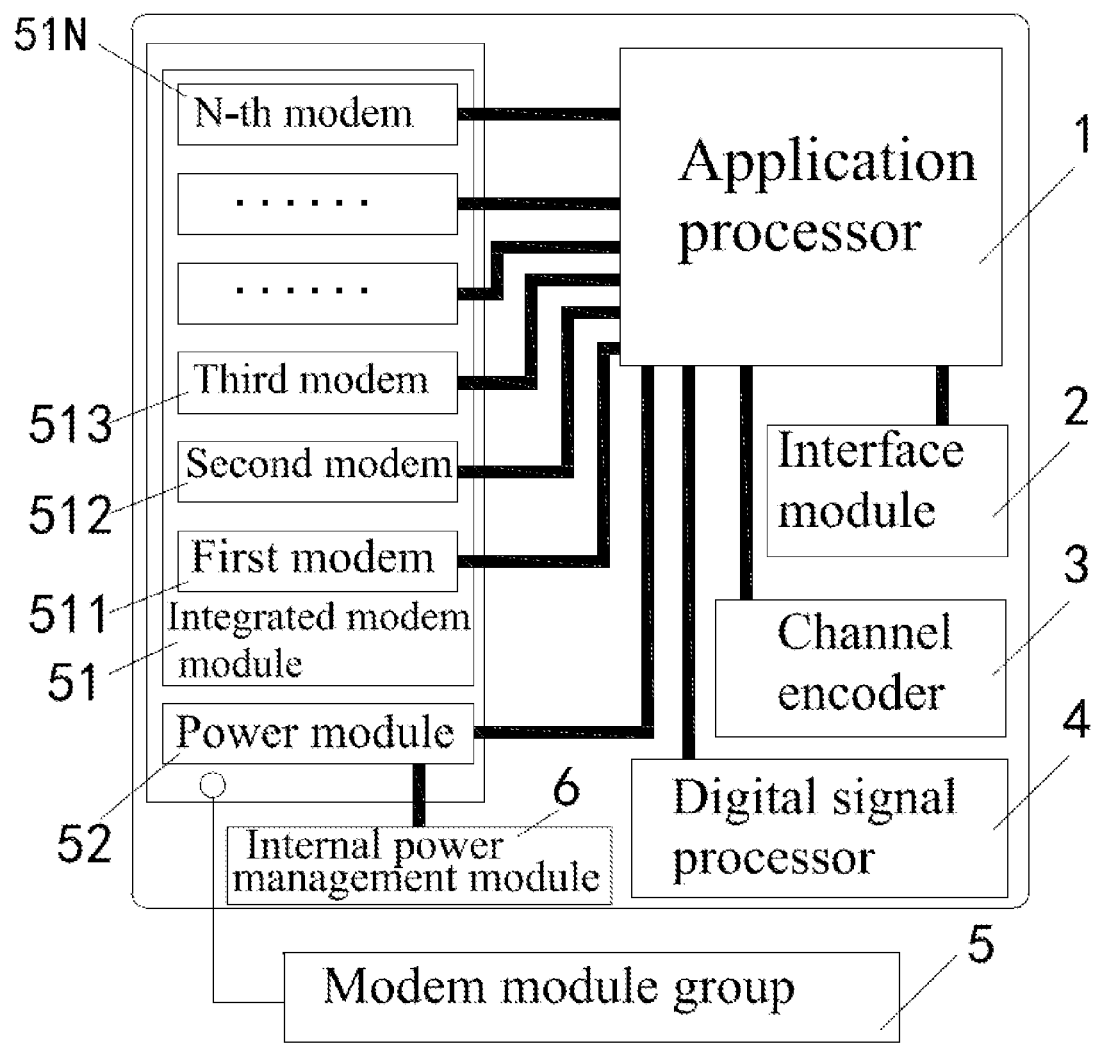
FIG. 1 illustrates a structural diagram of the baseband chip and the baseband chip management system according to an embodiment of the present disclosure.

Herein the structural presentation of embodiment for the baseband chip and the baseband chip management system as refer to FIG. 1. In FIG. 1, the baseband chip comprising an application processor 1, an interface module 2, a channel encoder 3, a digital signal processor 4, and a modem module group 5. The modem module group 5 comprising an integrated modem module 51 and a power module 52, the integrated modem module 51 comprising at least two modems. In other words, the integrated modem module 51 is formed by multiple modems which are connected to numerous radio frequency module systems, and linked up with the application processor 1. It means each modem is connected to the application processor 1, and each modem is connected to a corresponding radio frequency module system, so the number of the radio frequency module system is equal to that of the modems. The integrated modem module includes at least two modems in order to communicate with the corresponding radio frequency module system of the radio frequency integrated system. In other words, each modem module would be paired with a corresponding radio frequency module system.

As an example, FIG. 1 shows N pieces of modems, N is an integer, and N≥2, the N pieces of modems are the first modem 511, the second modem 512, the third modem 513, . . . , the Nth Modems 51N. In practical, the number of modems used is allowed to configure depends on the particular embodiment.

In the embodiment, the application processor 1 is connected to the interface module 2, the channel encoder 3, the digital signal processor 4 and the power module 52 separately. The application processor 1 manages and controls the task performing on the modem module group 5, and the application processor 1 also manages and controls the power supply to each modem in integrated modem module 51 via the power supply module 52.

In the embodiment, the modem module group 5 is used to manage and control the operation of the integrated modem module 51 and the power module 52. The interface module 2 provides various interfaces. In this embodiment, the interface module 2 includes an analog interface, a digital interface, and a human-machine interface, wherein the analog interface, the digital interface, and the human-machine interface are all connected to the application processor 1, so that the application process 1 is enabled to control and manage the interface module 2. Certainly, the types of interfaces on interface module 2 are adjustable according to the requirement in a particular embodiment.

In the embodiment, the channel encoder 3 is used to perform channel coding and encryption on service information and control information etc. Channel coding includes convolutional encoding, FIRE coding which is used to detect and correct the burst error code of the channel encoder 3, parity check coding, interleaving, burst pulse format etc.

In the embodiment, the digital signal processor 4 is used to perform channel equalization using a Viterbi algorithm and speech encoding/decoding based on a Regular Pulse Excited-Long Term Prediction technique (PRE-LPC). The power module 52 provides power supply, manage and control of each modem module (the first modem 511, the second modem 512, the third modem 513, . . . , the Nth modem 51N etc). Each modem is connected to the application processor 1 and the corresponding radio frequency integrated system. The role of the modem is signal modulation and demodulation, it means to modulate and/or demodulate the signals. In this embodiment, multiple modems are simultaneously performing modulation or demodulation operations for a plenty of information.

It is worth to point out that, the interface module 2, the channel encoder 3 and the digital signal processor 4 is configured independently, or able to be mutually communicated with each other in this embodiment.

In the embodiment, the modem module group 5 configures a dedicated transmission channel for each modem independently. In other words, the modem module group 5 configures multiple unique transmission channels for groups of modems, which are connected to the application processor 1 and radio frequency integrated system, multiple modems able to process the modulation and/or demodulation operations in parallel simultaneously.

The modem module group 5 is composed of the integrated modem module 51 and the power module 52, and the integrated modem module 51 is consisted of a plurality of modems, so that each of them communicated with the corresponding radio frequency module systems in the integrated system. Therefore, this disclosure fulfills the operations of modulation, demodulation and transmission of multiple independent data signals on one device concurrently, this is applicable for scenarios that processing numerous operation modes and with multiple operation tasks from multiples users on the same platform simultaneously.

In this embodiment, the baseband chip has a built-in internal power management module 6, the power module 52 is connected to the internal power management module 6, and the internal power management module 6 supplies power. The power supply module 52 provides power supply, manage and control multiple modems in the modem module group 5.

The baseband chip is applied to a fixed communication terminal, a mobile communication terminal, a fixed device terminal, a mobile device terminal, a mobile vehicle-mounted communication terminal, an aircraft, or an aerospace device communication terminal.

Figure 2:
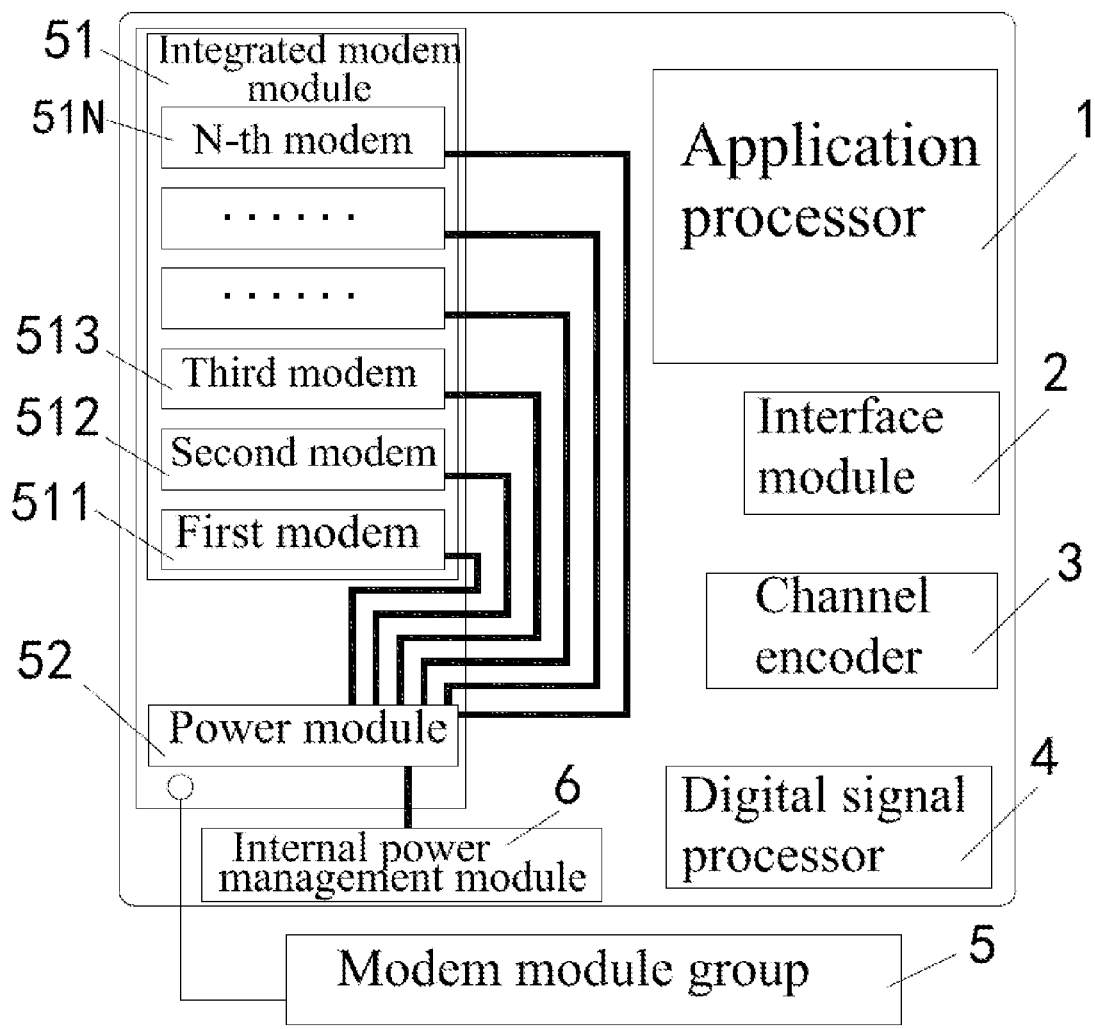
FIG. 2 illustrates a diagrammatic presentation of power supply on the baseband chip according to an embodiment of the present disclosure.

FIG. 2 is presenting the diagram of power supply on baseband chip. The internal power management module 6 provides power supply to the power module 52. The power module 52 is connected to each modem separately, means it links up with the first modem 511, the second modem 512, the third modem 513, . . . , the Nth modem 51N, and to supply power, manage and control each of the modem.

Figure 3:
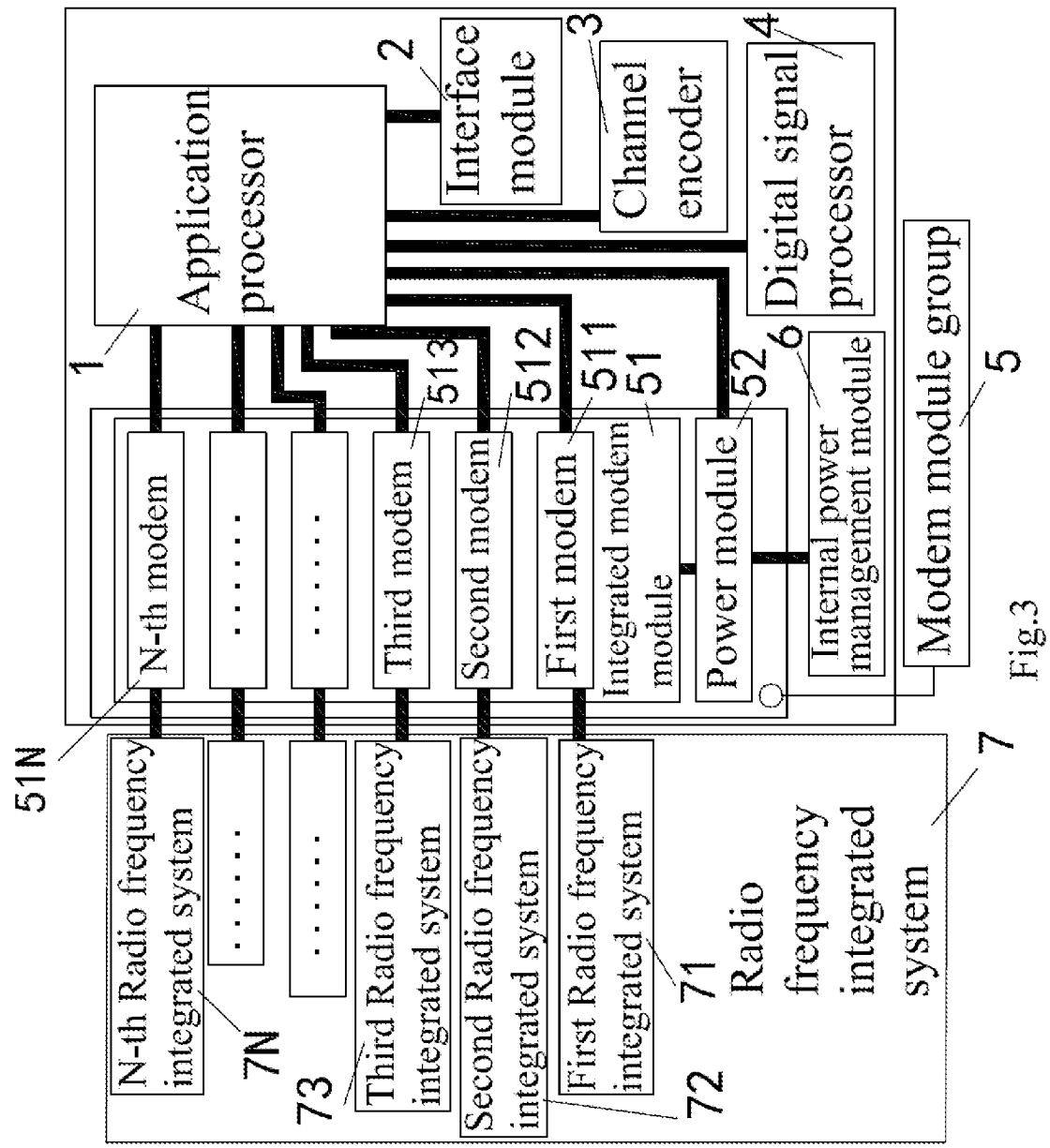
FIG. 3 illustrates a structural diagram of the baseband chip management system according to an embodiment of the present disclosure.

In this embodiment, it is also a baseband chip management system as shown in FIG. 3. In FIG. 3, the baseband chip management system comprises a baseband chip and a radio frequency integrated system 7. The radio frequency integrated system 7 comprises at least two radio frequency module systems such as the first Radio frequency integrated system 71, the second Radio frequency integrated system 72, the third Radio frequency integrated system 73 . . . and the N-th Radio frequency integrated system 7N. The baseband chip is shown in this embodiment as described above. Each of the modems in the baseband chip is connected to a corresponding radio frequency module system.

In this embodiment, when the information of the radio frequency integrated system 7 is transmitted to the first modem 511 in the integrated modem module 51, the first modem 511 demodulates the received information, and the demodulated information is transmitted to the application processor 1 which performs the processing work; when the information of the RF integrated system 7 is transmitted to the second modem 512 in the integrated modem module 51, the second modem 512 demodulates the received information, and the demodulated information is transmitted to the application processor 1 for further process, and such that demodulation operations are performed on pieces of information from the radio frequency integrated system 7.

And, when the information of the application processor 1 is transmitted to the first modem 511 in the integrated modem module 51, the first modem 511 modulates the information, and the modulated information is transmitted to the radio frequency integrated system 7 for the next operation; when the information of the application processor 1 is transmitted to the second modem 512 in the integrated modem module 51, the second modem 512 modulates the received information, and the modulated information is transmitted to the radio frequency integrated system 7 for the next operation; and so on, such that modulation operations are performed on pieces of information from the application processor 1.

The baseband chip management system is applied to a fixed communication terminal, a mobile communication terminal, a fixed device terminal, a mobile device terminal, a mobile vehicle-mounted communication terminal, an aircraft, or an aerospace device communication terminal.

As a conclusion, the modem module group 5 is composed of integrated modem module 51 and power module 52, and the integrated modem module 51 is consisted of a plurality of modems, so that each of them communicated with the corresponding radio frequency module systems in the integrated system. This disclosure fulfills the operations of modulation, demodulation and transmission of multiple independent data signals on one device concurrently, can satisfy the application scenarios that multiple people can carry out multiple modes and work in the same webpage at the same time.

Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present invented technology scheme, whatever simple modification and equivalent variation belong to the protection range of the present invented technology scheme.

What is claimed is:

1. A baseband chip, comprising an application processor, an interface module, a channel encoder, a digital signal processor, and a modem module group, the modem module group comprising an integrated modem module and a power module, the integrated modem module comprising at least two modems, the application processor being connected to the interface module, the channel encoder, the digital signal processor, and the power module, respectively, the channel encoder being configured to perform channel coding and encryption on service information and control information, the digital signal processor being configured to perform channel equalization using a Viterbi algorithm and speech encoding/decoding based on a Regular Pulse Excited-Long Term Prediction technique, the power module being configured to provide power supply, management, and control for each of the modems, wherein each of the modems is connected to the application processor, and a plurality of the modems concurrently perform operation tasks of modulation or demodulation on a plurality of pieces of information.

2. The baseband chip according to claim 1, wherein an internal power management module is built therein, and the power module is connected to the internal power management module so that power is supplied by the internal power management module.

3. The baseband chip according to claim 1, wherein the modem module group manages and controls the integrated modem module and the power module.

4. The baseband chip according to claim 1, wherein the application processor manages and controls the operation tasks of the modem module group, and manages and controls the power module to supply power to each group of the modems.

5. The baseband chip according to claim 1, wherein the modem module group sets, for each of the modems, a separate dedicated transmission channel which is connected to the application processor and the radio frequency integrated system, respectively, and the plurality of the modems can concurrently perform modulation and/or demodulation operations.

6. The baseband chip according to claim 1, wherein the interface module comprises an analog interface, a digital interface, and a human-machine interface, wherein the analog interface, the digital interface, and the human-machine interface are all connected to the application processor so that the application processor is enabled to control and manage the interface module.

7. The baseband chip according to claim 1, applied to a fixed communication terminal, a mobile communication terminal, a fixed device terminal, a mobile device terminal, a mobile vehicle-mounted communication terminal, an aircraft, or an aerospace device communication terminal.

8. A baseband chip management system, comprising a baseband chip and a radio frequency integrated system, wherein the radio frequency integrated system comprises at least two radio frequency module systems, the baseband chip is the baseband chip according to claim 1, and each of the modems in the baseband chip is connected to a corresponding one of the radio frequency module systems.

9. The baseband chip management system according to claim 8, wherein when information of the radio frequency integrated system is transmitted to the first modem in the integrated modem module, the first modem performs a demodulation operation on the received information, then the demodulated information is transmitted to the application processor for processing; when information of the radio frequency integrated system is transmitted to the second modem in the integrated modem module, the second modem performs a demodulation operation on the received information, then the demodulated information is transmitted to the application processor for processing; and so on, such that demodulation operations are performed on pieces of information from the radio frequency integrated system; and when information of the application processor is transmitted to the first modem in the integrated modem module, the first modem performs a modulation operation on the information, then the modulated information is transmitted to the radio frequency integrated system for a next operation; when information of the application processor is transmitted to the second modem in the integrated modem module, the second modem performs a modulation operation on the received information, then the modulated information is transmitted to the radio frequency integrated system for a next operation; and so on, such that modulation operations are performed on pieces of information from the application processor.

10. The baseband chip management system according to claim 8, applied to a fixed communication terminal, a mobile communication terminal, a fixed device terminal, a mobile device terminal, a mobile vehicle-mounted communication terminal, an aircraft, or an aerospace device communication terminal.

\* \* \* \* \*